Figure 1:
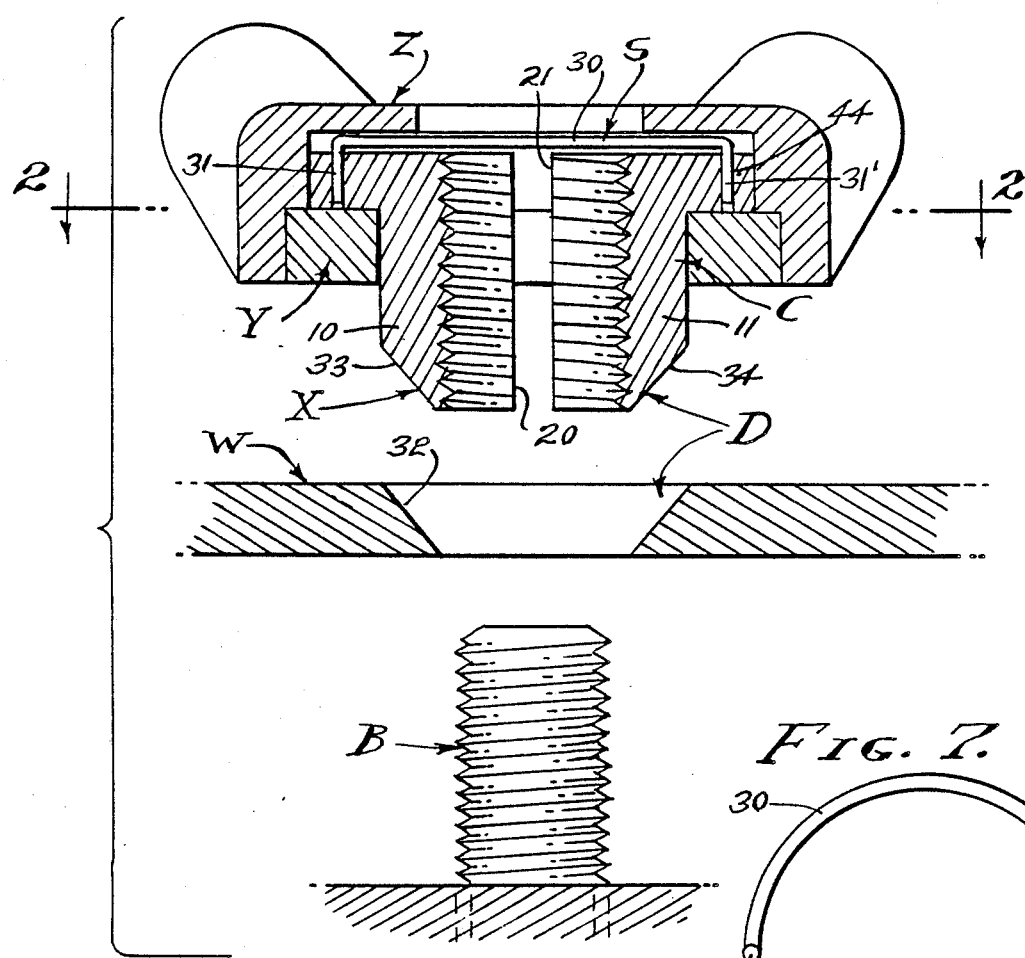

United States Patent [19]
Weis

[11] Patent Number: 4,930,961
[45] Date of Patent: Jun. 5, 1990

[54] QUICK LOCK AND RELEASE FASTENER

[76] Inventor: Charles W. Weis, 6 Sky Mountain Cir., Chico, Calif. 95928

[21] Appl. No.: 288,862

[22] Filed: Dec. 23, 1988

[51] Int. Cl.⁵ .............................................. F16B 39/36
[52] U.S. Cl. ..................................... 411/266; 411/267; 411/432
[58] Field of Search ............... 411/265, 268, 270, 272, 411/273, 432, 433, 437

[56] References Cited

U.S. PATENT DOCUMENTS

| | | | |
|---|---|---|---|
| 750,675 | 1/1904 | Michelin | 411/432 |
| 820,941 | 5/1906 | Swarthout | 411/273 |
| 2,367,480 | 1/1945 | Beswick | 411/433 |
| 2,736,227 | 2/1956 | Stroble | 411/433 |
| 3,352,341 | 11/1967 | Schertz | 411/270 |
| 4,068,697 | 1/1978 | Schiaffino | 411/270 |
| 4,083,393 | 4/1978 | Okada | 411/267 |
| 4,462,731 | 7/1984 | Rovinsky et al. | 411/433 |

FOREIGN PATENT DOCUMENTS

| | | | |
|---|---|---|---|
| 45-30852 | 10/1970 | Japan | 411/433 |
| 47-20530 | 6/1972 | Japan | 411/433 |
| 391297 | 11/1973 | U.S.S.R. | 411/433 |
| 1343136 | 10/1987 | U.S.S.R. | 411/433 |
| 558302 | 12/1943 | United Kingdom | 411/433 |

Primary Examiner—Gary L. Smith
Assistant Examiner—Jerry Redman
Attorney, Agent, or Firm—William H. Maxwell

[57] ABSTRACT

A quick lock and release fastener in the form of a split nut with a circumferentially truncated thread and drawn together or separable by a cam operable by rotation in one form or by reciprocation in a second form, to be placed over an externally threaded member and threadedly engaged therewith by a fractional turn of a head in the first form, or by reciprocation of a head in the second form, with spring return for separation of the split nut, and with constrictive engagement with the workpiece to be fastened.

24 Claims, 4 Drawing Sheets

FIG. 8.

FIG. 9.

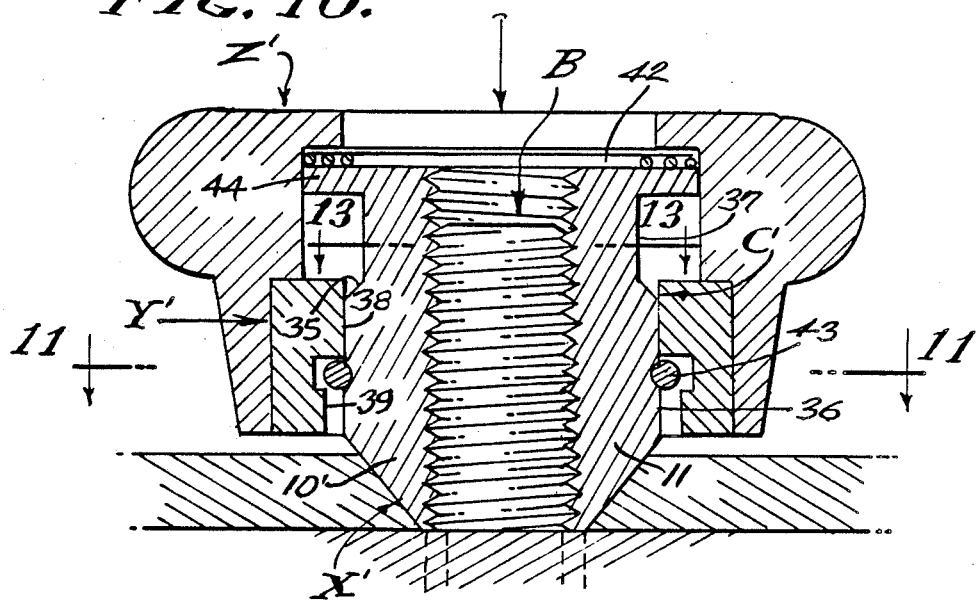
Fig. 10.
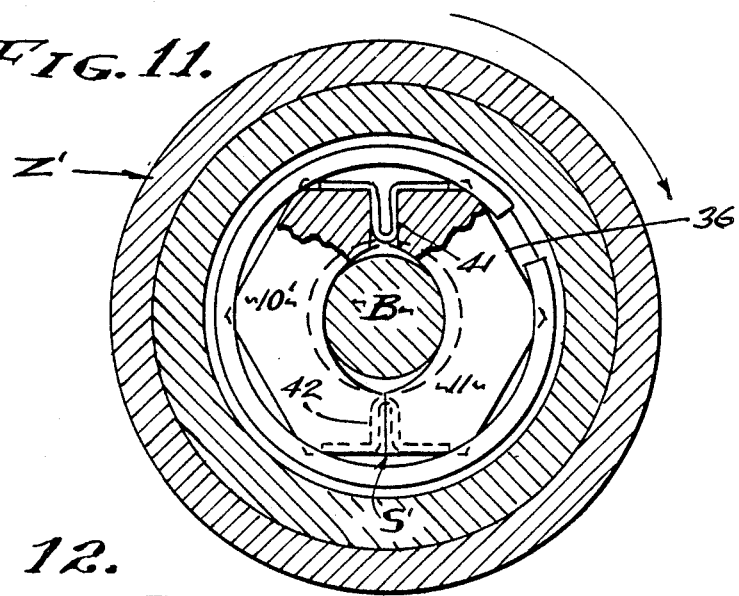
Fig. 11.
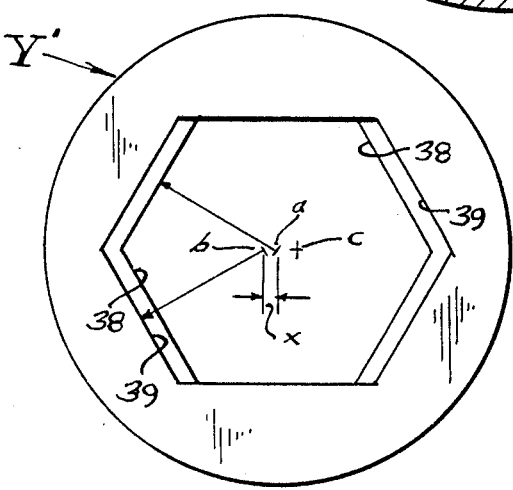
Fig. 12.
Fig. 13.

QUICK LOCK AND RELEASE FASTENER

BACKGROUND OF THE INVENTION

This invention relates to a nut type fastener applicable to a threaded bolt or the like. The purpose is to enable placement of the fastener over a bolt, screw or stud, and to tighten the same onto a workpiece upon a fractional turn thereof. Two types of nut fasteners of this type have been proposed, those which turn to threadedly engage, and those which reciprocate to do so, a characteristic feature thereof being the use of cams.

With regard to the turning or twist type of nut control, there is U.S. Pat. No. 820,941 to Swarthout which discloses the basic concept of having two nut halves and a surrounding cam that forces the two halves together so as to engage a threaded bolt. And there is U.S. Pat. No. 4,083,393 to Okada which discloses a quick insertion concept, but with no quick release. Although split nuts are disclosed, they have full threads with no suggestion of semi threads.

With regard to the reciprocating type of nut control, there is U.S. Pat. No. 2,367,480 to Beswick which discloses segments with full threads with a locking taper nut interior, but with no cone engagement with the workpiece, and with no snap ring for securement. There is U.S. Pat. No. 750,675 to Michelin which discloses an externally threaded collet that draws split threads together, but no cone engagement with the workpiece. There is U.S. Pat. No. 3,352,341 to Schertz which discloses spring separation of splt parts driven by ribs, but no cone engagement with the workpiece. And there is U.S. Pat. No. 4,068,697 to Schiaffino which discloses a tapered collet like nut entering a sleeve, but with no cone engagement with the workpiece.

It is a general object of this invention to provide a manually operable nut that is adapted to be quickly locked on or released from a threaded member to secure a workpiece. As described herein there are two forms of quick lock and release fasteners, both embodying a split nut and cam lock and release principle of operation; a first form operating by manual turning or twisting, and a second form operating by reciprocation or push-pull manipulation. The concept herein disclosed is characterized by a split nut that is cam operated to contract together and cam controlled to separate. The cam is manually operated by turning in the first form, and by reciprocation in the second form. A feature and object of this invention is the fractional turn and/or short reciprocal stroke involved to engage or to loosen the fastener.

It is an object of this invention to provide a split nut for releasable threaded engagement with a bolt or the like, whereby diametral movements are reduced and minimized. To this end the internal nut threads are circumferentially truncated, and referred to herein as semi threads, as will be described and as clearly shown in the drawings.

It is an object of this invention to provide constrictive driving engagement of the split nut with the worpiece, whereby thread engagement and cam operation is ensured. With the present invention nut engagement with the workpiece is by means of cone engagement into a complementary countersink in the workpiece, forcing the split nut halves into thread engagement, and for holding them against rotation for operation in the first form of turning or twist type fastener disclosed herein.

It is an object of this invention to provide for automatic separation of the split nut halves, whereby application of the fastener over a threaded bolt is facilitated. To this end spring means separates the split nut halves, while permitting them to be cammed together over the bolt.

It is an object of this invention to provide positioning means to locate the cam control of the fastener in either the locking mode or the release mode, as may be required. This feature is found in the second form wherein there is a detent means holding said two modes. In practice, a snap ring is carried by a drive plate to ride over the cam shaped exterior of the split nut halves. Additionally, a return spring lifts the drive plate to the release mode, ready for application to a threaded bolt or the like.

SUMMARY OF THE INVENTION

Figure 2:
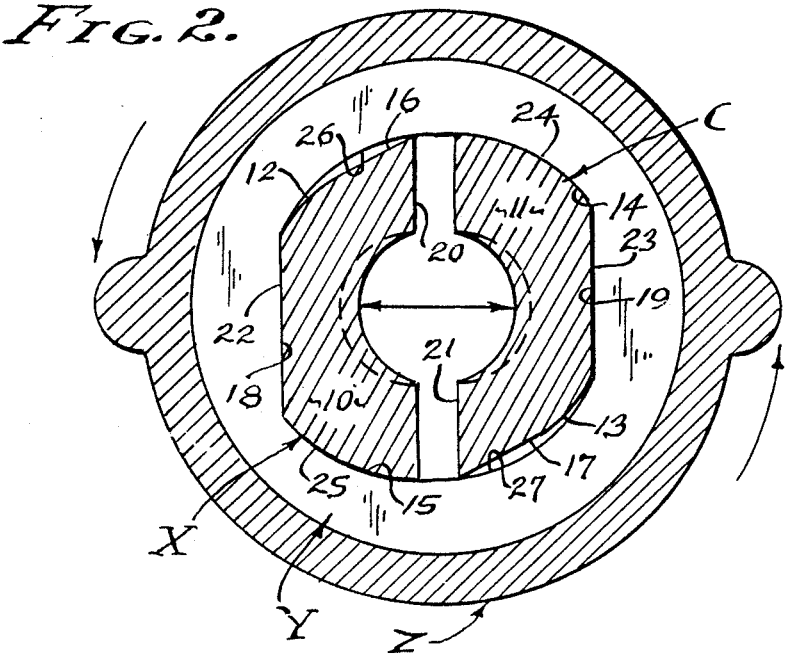
Figure 3:
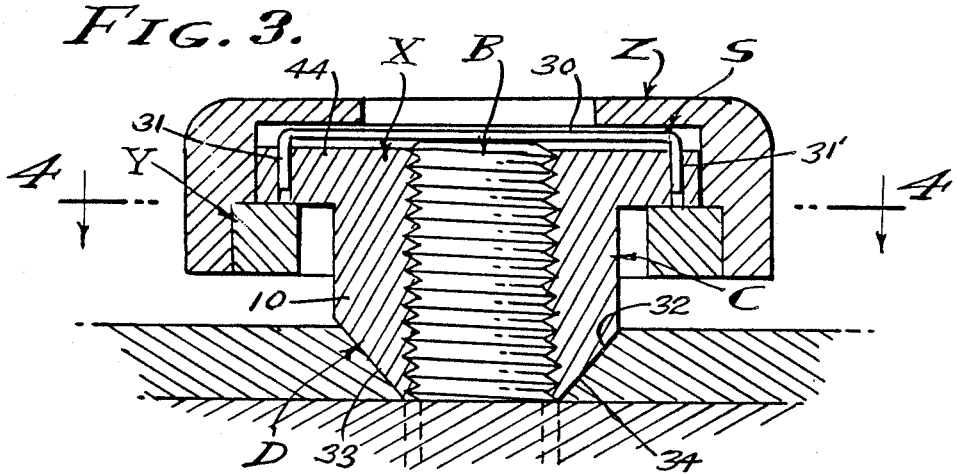
Figure 4:
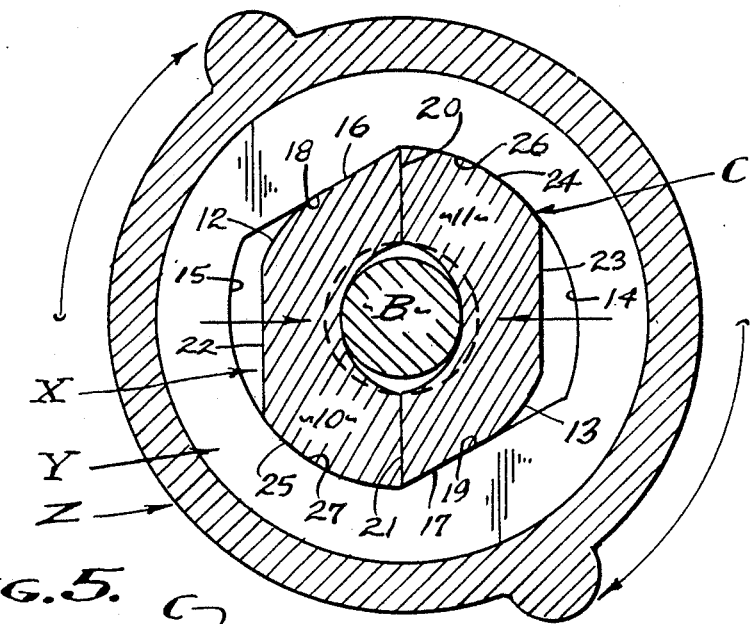

The first form of fastener disclosed in FIGS. 1 to 7 of the drawings involves two nut halves separated by a semi-circular spring. There is a cam plate that has diametrically opposed involute cam surfaces to engage complementary cam surfaces on a barrel portion of the nut halves. The bottom workpiece engaging ends of the nut halves form a true cone when held together as shown in FIGS. 3 and 4, there being a drive function when engaged with a mating countersink in the workpiece, while simultaneously forcing the nut together so as to engage the nut threads at the lower ends thereof. In order to engage and lock the fastener, it is manually pressed into the workpiece countersink and is then turned a fraction of a turn clockwise, so that the cam engagement brings the entire height of the nut halves into engagement of the threads onto the threaded bolt. Thereupon, the fastener is tightened and is locked by the cone engagement into the workpiece countersink. Removal is by reverse turning which releases the nut halves that are then separated by the spring. The twist operation is approximately one quarter turn.

Figures 8, 9:
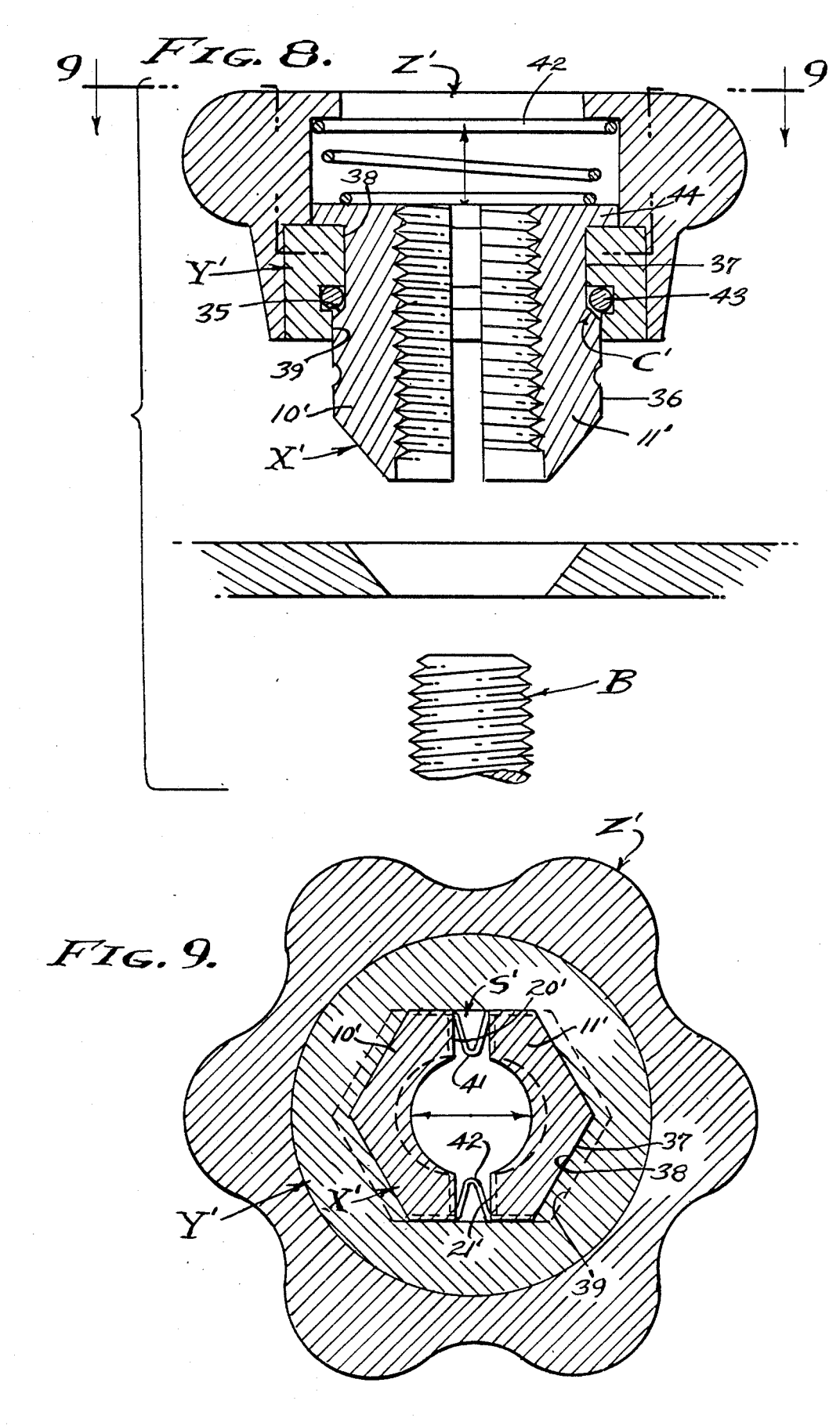

The second form of fastener disclosed in FIGS. 8 to 13 of the drawings involves two nut halves separated by springs. The exterior lower portions of the nut halves form a true hexagonal form when drawn together for driving engagement within a complementary hexagonal opening in a drive plate. The upper portion of the nut halves form a reduced sized hexagonal form that permits separation within a hexagonal opening in the drive plate, when said plate is lifted or pulled upwardly as shown in FIGS. 8 and 9. By pushing the drive plate downwardly and over a full sized hexagonal portion of the nut halves, they are forced together as shown in FIGS. 10 and 11 so as to complete the thread. A snap ring is carried by a groove in the drive plate to ride out of the release mode and into the lock mode, and vice versa, snapping into corner notches at the hexagonal corners. Engagement of the fastener is by pushing so as to bring the nut halves together, followed by turning to tighten. Removal is a revereseprocedure. The reciprocal movement is approximately one half the diameter of the threaded bolt or stud to be fastened to.

The foregoing and various other objects and features of this invention will be apparent and fully understood from the following detailed description of the typical preferred form and application thereof, throughout which description reference is made to the accompanying drawings.

THE DRAWINGS

Figure 7:
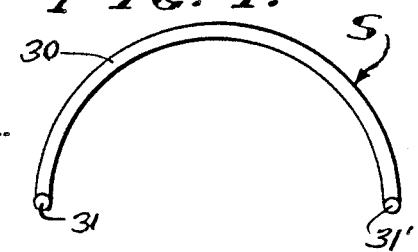
Figure 5:
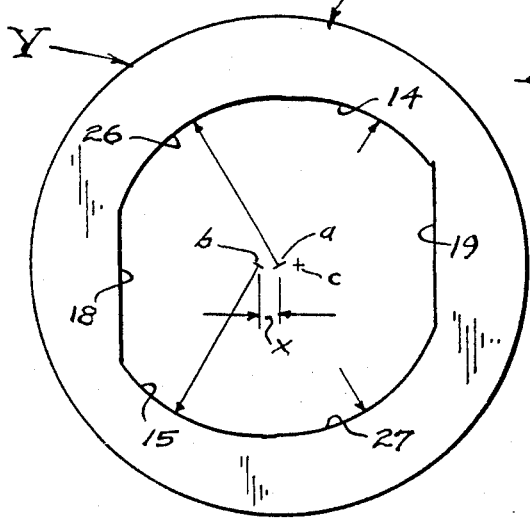
Figure 6:
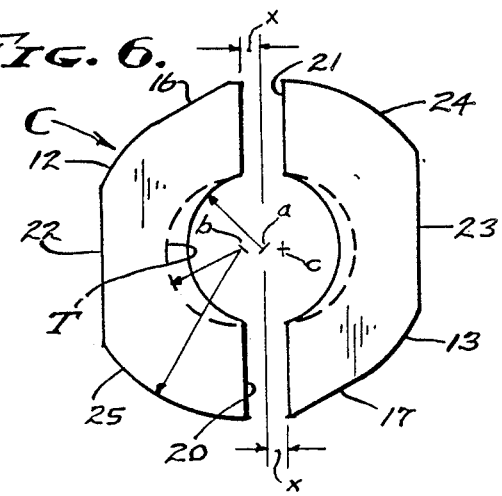

FIGS. 1 through 6 disclose a first form of the invention, FIG. 1 being an enlarged transverse cross section of the twist type of fastener, showing it in the release mode preparatory to fastening to a threaded bolt with a workpiece therebetween. FIG. 2 is a sectional view taken as indicated by line 2 - 2 on FIG. 1. FIG. 3 is a view similar to FIG. 1 and shows the lock mode. FIG. 4 is a sectional view taken as indicated by line 4 - 4 on FIG. 3. FIG. 5 is a plan view of the drive plate cam surfaces, removed from the assembly. FIG. 6 is a plan view of the split nut halves, removed from the assembly. And, FIG. 7 is a plan view of the separation spring, removed from the assembly.

FIGS. 8 through 13 disclose a second form of the invention, FIG. 8 being an enlarged transverse cross seciton of the push-pull type of fastener, showing it in the release mode preparatory to fastening to a threaded bolt with a workpiece therebetween. FIG. 9 is a sectional view taken as indicated by line 9—9 on FIG. 8. FIG. 10 is a view similar to FIG. 8 and shows the lock mode. FIG. 11 is a sectional view taken as indicated by line 11—11 on FIG. 10. FIG. 12 is a bottom view of the drive plate cam surfaces, removed from the assembly. And, FIG. 13 is a plan view of the split nut halves, removed from the assembly.

PREFERRED EMBODIMENT

Referring now to the drawings, the quick lock and release fasteners of the present invention involve generally, a split nut X (X') operable within a drive plate Y(Y'), and an operating head Z(Z') that carries the split nut X and drive plate Y in an assembled unit. The split nut X is comprised of a separably opposed pair of diametrically opposite portions characterized by semi threads mated for threaded engagement with a bolt B, or threaded stud or screw, as shown. The split nut X and drive plate Y have cam engagement for constriction into threaded engagement and alternate separation with the bolt B by cam means C or C', either by rotation in a first form or by reciprocation in a second form. In practice, separation means S(S') separates the split nut portions from their constricted positions. And, a feature is pilot and lock means D for engaging the split nut X with the bolt B prior to turning of the operating head Z to tighten the fastener assembly.

In FIGS. 1 to 7 of the drawings the first form embodiment is shown wherein operation is by twisting the operating head Z fixed to the drive plate Y. As is illustrated in FIGS. 2 and 4 operation is by twisting counterclockwize for nut separation (see FIG. 2), and by twisting clockwize for constriction (see FIG. 4). Following said constrictive twisting, continued clockwise turning effects tightening onto the bolt B. In this first form of the invention the cam means C operates by relative rotation between the split nut X and the drive plate Y carried by the operating head Z, and involves involute outwardly disposed cam faces 12 and 13 on diametrically opposite nut portions 10 and 11 complementary with involute inwardly disposed cam faces 14 and 15 on diametrically opposite portions of the drive plate Y. In order to provide driving engagement of the drive plate Y with the split nut X as shown in FIG. 4, the involute faces 12 and 13 continue into parallel and diametrically spaced flat portions 16 and 17 that engage with complementary diametrically opposite flat portions 18 and 19 continuing from the faces 15 and 14 on the opposite portions of the plate Y. Accordingly, constrictive drive engagement occurs as shown in FIG. 4, while separation is permitted as shown in FIG. 2.

Referring to the split nut X exterior and cam means C. FIG. 6 illustrates the relationship thereof with respect to the semi-threads T, as follows: The nut portions 10 and 11 are circular halves with engageable inner faces 20 and 21 adapted to engage on and separate from a plane coincidental with and intersecting separable axes b and c. The outside thread diameter is turned about axes b and c, while the inner thread diameter is turned about a center axis a when the two nut halves 10 and 11 are separated as shown in FIG. 6. The separation is such as to permit free passage of bolt B. However, when faces 20 and 21 are engaged the outer thread diameter becomes concentric for circumferential engagement with bolt B. Thus, there are semi threads which are essentially of truncated form as shown. It will be observed that axes a, b and c become coincidental when the nut halves are constricted together as shown in FIG. 4.

The effective cam surfaces at opposite sides of the split nut X and drive plate Y are identical, one side of which will now be described: Considering the split nut X and progressing clockwize in FIG. 6, there is a flat face 22 (23) that is complementary to face 18 of the drive plate Y and which mates therewith when the split nut is separated as shown in FIG. 2. Face 22 (23) is followed by the involute face 12 (13), which is then followed by the flat portion 16 (17). The portions 22, 12 and 16 are formed on the one nut portion, for example portion 10, while a continuing portion 24 (25) is formed on the following nut portion 11. In practice, the portion 24 (25) is concentric with axis c (b), while the portion 12 (13) is inwardly eccentric on axis a and tangent to the inwardly offset truncation of flat portion 16 (17).

Considering the drive plate Y opening and progressing clockwize in FIG. 5, there is the flat face 18 (19) of the plate that is complementary to the face 22 (23) of the split nut X when the split nut is separated as shown in FIG. 2. Face 18 (19) is followed by a concentric face 26 (27) turned about the central axis a and complementary to the portion 24 (25) when the split nut X is constricted as shown in FIG. 4. Continuing clockwize from portion 26 (27) there is the outwardly eccentric portion 14 (15) that is complementary to the portion 24 (25) when the split nut X is separated as shown in FIG. 2, and which clears the face 23 (22) when the split nut X is constricted as shown in FIG. 4.

The curvatures of faces 24 and 25 are of the same radius as faces 14 and 15 about axes c and b, so that they mate eccentrically as shown in FIG. 2 when the split nut X is separated. And, the curvatures of faces 26 and 27 about axis a are of the same radius as faces 24 and 25, so that they mate concentrically as shown in FIG. 4 when the split nut X is constricted. In the release mode of FIG. 2 the nut driving faces 16 and 17 are ineffective within the faces 26 and 27, while in the lock mode of FIG. 4 they have effectively engaged with the driving faces 18 and 19 of the driving plate Y.

By comparing FIGS. 2 and 4 in light of FIGS. 5 and 6 it will be understood how the split nut X separates and constricts so as to either pass the bolt B or to complete the threaded engagement therewith. The split nut X is prevented from turning, as will be later described, so that clockwise rotation of the drive plate Y cams the portion 10 and 11 together, while counterclockwise rotation permits them to separate.

The separation means S separates the split nut portions 10 and 11 as shown in the release mode of FIG. 2, and permits their constriction in the lock mode as shown in FIG. 4. The separation means S is a compression spring 30 engaged between nut portions 10 and 11 as shown in FIGS. 1 and 3. In practice, the spring 30 is semi circular (see FIG. 7) with depending ends 31 and 31' engaged in openings in the portions 10 and 11 to separate them as shown, when the spring expands.

The pilot and lock means D can vary as may be required, and is essentially a frictional engagement means between the split nut X and the workpiece W to be fastened. The pilot function of means D, as disclosed herein, is that of guiding the nut halves 10 and 11 constrictively into threaded engagement with the bolt B. The lock function of means D, as disclosed herein, is that of preventing loosening after the fastener is tightened. To these ends, the workpiece is provided with a countersink 32 of conical form, and the bottoms of the nut halves 10 and 11 are provided with complementary tapered cone portions 33 and 34. That is, the nut portions 10 and 11 are tapered so as to form a mating cone when they are constricted by engagement with the countersink 32. Accordingly, the lowermost ends of the nut halves are brought together for partial bolt engagement prior to operation of the drive plate Y which then establishes full height threaded engagement with the bolt B. When the fastener is tightened, the tapered cone 33 - 34 and countersink 32 engagement is self locking through increased frictional engagement thereof.

In FIGS. 8 to 13 of the drawings the second form embodiment is shown wherein operation is by reciprocating the operating head Z' a short distance as shown. As best illustrated in FIGS. 8 and 10 operation is by pulling the head Z' upward for separation (see FIG. 8), and by pushing downward for constriction (see FIG. 10). Following said constriction, the operating head Z' is turned clockwize for tightening the fastener onto the bolt B. In this second embodiment form the cam C' operates by relative reciprocation between the split nut X' and the drive plate Y' carried by the operating head Z', and involves an outwardly disposed inclined cam-face 35 on the diametrically opposed and separable nut portions 10' and 11' operable within a stepped opening in the drive plate Y'. The second form embodiment differs from the first form embodiment as follows:

Referring to FIGS. 8, 10 and 13 of the drawings, the nut halves 10' and 11' are of polygonal cross section, having a lower portion 36 of full polygon configuration and having an upper portion 37 of reduced polygon configuration. In accordance with this invention, the lower portion 36 is of full hexagonal form, when the nut halves 10' and 11' are constricted together as shown in FIG. 11. However, the nut halves 10' and 11' are permitted to separate by virtue of the upper portion 37 being of reduced configuration in one diametrical direction, whereby the nut halves 10' and 11' separate as shown in FIG. 9. Accordingly, the upper portion 37 of the constricted nut portions is stepped inwardly from the lower portion 36 of full hexagon configuration.

Referring to FIGS. 8, 10 and 12 of the drawings, the drive plate Y' is of polygonal form having an upper portion 38 of full hexagon configuration, and having a lower portion 39 of expanded hexagon configuration. Accordingly, the lower portion 39 of the drive plate Y' is stepped outwardly from the upper portion of full hexagon configuration.

As a result of the complementary stepped configurations of the nut halves 10' and 11' and the drive plate portions 38 and 39, the exterior lower portion 36 of the nut halves forms a true hexagon when constricted for driving engagement within the complementary hexagon portion 38 in the drive plate Y'. The upper portion 37 of the nut halves forms a diametrically reduced sized hexagon that permits split nut separation within the lower portion 39 of the drive plate Y', when the drive plate is lifted as shown in FIG. 8, by pulling upwardly on the operating head Z'. By pushing downwardly as shown in FIG. 10, the drive plate Y' is moved downward and over the lower full sized hexagonal portion of the nut halves, so that they are forced together as shown in FIG. 11 to complete the threaded engagement with the bolt B.

By comparison of FIGS. 9 and 10 in light of FIGS. 12 and 13 it will be understood how the split nut X' separates and contricts so as to either pass the bolt B or to complete the threaded engagement with the bolt. The split nut is locked against loosening as described in the first form embodiment. A stop flange 44 on the split nut, in both form embodiments, engages the top of the drive ring to limit movement and retain assembly.

The separation means S' is similar to that disclosed in the first form embodiment, and is shown as a pair of compression springs 40 and 41 carried in recesses at opposed faces 20' and 21' of the split nut portions 10' and 11'.

The second form embodiment includes a return spring 42 to hold the operating head Z' in the release mode as shown in FIG. 8, the spring being conical and depressible to a flat condition as shown in the lock mode of FIG. 10. Cooperating with return spring 42 there is a mode positioning means in the form of a snap ring 43 carried by a grooved step between the hexagon portions 38 and 39 of the drive plate Y', and disengageable from grooved corners of the lower hexagon portion 36 of the split nut portions 10' and 11'. It will be apparent from FIGS. 8 and 10 how the snap ring 43 frictionally holds the release mode position, and has a detent function holding the lock mode position.

Having described only the typical preferred forms and applications of my invention, I do not wish to be limited or restricted to the specific details herein set forth, but wish to reserve to myself any modifications or variations that may appear to those skilled in the art, as set forth within the limits of the following claims.

I claim:

1. A quick lock and release fastener and workpiece for securing said workpiece to a threaded bolt, and including;
    a split nut comprised of opposed semicircular members with opposed semicircular threads to threadedly engage the threaded bolt,
    a drive plate with an opening therethrough to pass the split nut and exposing a bottom of the split nut for engagement with the workpiece,
    a pilot and lock means at the bottom of the split nut guiding the semicircular members thereof into constrictive and locked threaded engagement with the bolt,
    an operating head fixed to the drive plate and carrying the split nut in an assembly therewith,
    and cam means operable between the exterior of the split nut and the opening through the drive plate to alternately constrict the split nut into full threaded engagement with the bolt and to permit separation of the same therefrom, an incline on the exterior of the split nut, said incline continuing into a flat face complementary to and driven by a flat face of the opening through the drive plate.

2. The quick lock and release fastener as set forth in claim 1, wherein separation means separates the semicircular members of the split nut into a release mode.

3. The quick lock and release fastener as set forth in claim 1, wherein separation means comprised of at least one compression spring disposed between the semicircular, members yieldingly separates them into a release mode.

4. The quick lock and release fastener as set forth in claim 1,
wherein separation means comprised of at least one compression spring disposed between the semicircular members yieldingly separates them into a release mode.

5. A quick lock and release fastener operable by rotation for engagement onto a threaded bolt for securement of a workpiece, and including;
a split nut comprised of opposed semicircular members with opposed semicircular threads to threadedly engage the threaded bolt,
a drive plate with an opening therethrough to pass the split nut and exposing a bottom of the split nut for engagement with the workpiece,
an operating head fixed to the drive plate and carrying the split nut in an assembly therewith,
and cam means operable between the exterior of the split nut and the opening through the drive plate and comprised of an involute curved circumferential incline on the exterior of the split nut, said incline continuing tangentially into a flat face of the split nut complementary to and driven by a flat face of the opening through the drive plate, whereby the split nut is either constricted into full threaded engagement with the bolt or is permitted to separate therefrom.

6. The quick lock and release fastener as set forth in claim 5, wherein the circumferential incline continues tangentially into the flat face on each of the semicircular members of the split nut, said inclines and flat faces being at diametrically opposite sides of the split nut to engage diametrically opposite faces of the opening through the drive plate.

7. The quick lock and release fastener as set forth in claim 5, wherein the circumferential incline is preceeded by the flat face on the split nut which is complementary to and engageable with the flat face of the opening through the drive plate when the fastener is in a release mode.

8. The quick lock and release fastener as set forth in claim 5, wherein the circumferential incline is preceeded by the flat face and a concentric portion on the split nut which are complementary to and engageable with the flat face and a concentric portion of the opening through the drive plate when the fastener is in a release mode.

9. The quick lock and release fastener as set forth in claim 5, wherein the circumferential incline is preceded by the flat face on each of the semicircular members of the split nut which are complementary to and engageable with opposed flat faces of the opening through the drive plate when the fastener is in a release mode, said preceeding flat faces being at diametrically opposite sides of the split nut to engage diametrically opposite faces of the opening through the drive plate when the fastener is in said release mode.

10. The quick lock and release fastener as set forth in claim 5, wherein the circumferential incline is preceded by the flat face and a circumferential portion on each of the semicircular
members of the split nut and which are complementary to and engageable with opposed flat faces of the opening through the drive plate when the fastener is in a release mode, said preceding flat faces and circumferential portions being at diametrically opposite sides of the split nut to engage diametrically opposite faces of the opening through the drive plate when the fastener is in said release mode.

11. The quick lock and release fastener as set forth in claim 5, wherein separation means separates the semicircular members of the split nut into a release mode.

12. The quick lock and release fastener as set forth in claim 5, wherein separation means comprised of at least one compression spring disposed between the semicircular members yieldingly separates them into a release mode.

13. The quick lock and release fastener as set forth in claim 5, wherein pilot and lock means guides the semicircular members into constrictive engagement with the workpiece for locked threaded engagement with the bolt.

14. The quick lock and release fastener as set forth in claim 5, wherein the cam means comprises the incline on the exterior of the split nut, said incline continuing into the flat face complementary to and driven by the flat face of the opening through the drive plate, wherein separation means comprised of at least one compression spring disposed between the semi circular members yieldingly separates them into a release mode, and wherein pilot and lock means guides the semicircular members into constrictive and locked threaded engagement with the bolt.

15. A quick lock and release fastener operable by reciprocation for engagement onto a threaded bolt for securement of a workpiece, and including:
a split nut comprised of opposed semicircular threaded to threadedly engage the threaded bolt,
a drive plate with an opening therethrough to pass the split nut and exposing a bottom of the split nut for engagement with the workpiece,
a return spring urging the drive plate from a lower enlarged portion of the split nut and toward engagement with a upper reduced portion of the split nut,
an operating head fixed to the drive plate and carrying the split nut in an assembly therewith,
and cam means operable between the exterior of the split nut and the opening through the drive plate and comprised of a longitudinal incline on the exterior of the split nut, said incline continuing into a flat face of the split nut complementary to and driven by a flat face of the opening through the drive plate, whereby the split nut is either constricted into full threaded engagement with the bolt or is permitted to separate therefrom.

16. The quick lock and release fastener as set forth in claim 15, wherein the longitudinal incline is a step between an enlarged lower drive portion of the split nut and the upper reduced release portion of the split nut, said enlarged and reduced portions of the split nut being engageable with and positioned by the flat face of the opening through the drive plate.

17. The quick lock and release fastener as set forth in claim 15, wherein the longitudinal incline is a step between the lower enlarged polygonal drive portion of the split nut and the upper reduced polygonal release portion of the split nut, said enlarged and reduced polygonal portions of the split nut being engageable with and positioned by the flat face of the opening through the drive plate.

18. The quick lock and release fastener as set forth in claim 15, wherein the longitudinal incline is a step between the lower enlarged hexagonal drive portion of the split nut and the diametrically upper reduced hexagonal release portion of the split nut, said enlarged and reduced portions of the split nut being engageable with and positioned by diametrically opposed flat faces of the opening through the drive plate.

19. The quick lock and release fastener as set forth in claim 15, wherein a mode positioning means engages over the incline to hold a release and lock mode of the fastener.

20. The quick lock and release fastener as set forth in claim 19, wherein the mode positioning means comprises a snap ring frictionally engageable with the upper reduced portion of the split nut and is engageable with a groove in the lower enlarged portion of the split nut.

21. The quick lock and release fastener as set forth in claim 15, wherein separation means separates the semicircular members of the split nut into a release mode.

22. The quick lock and release fastener as set forth in claim 15, wherein separation means comprised of at least one compression spring disposed between the semicircular members yieldingly separates them into a release mode.

23. The quick lock and release fastener as set forth in claim 15, wherein pilot and lock means guides the semicircular members into constrictive and locked threaded engagement with the bolt.

24. The quick lock and release fastener as set forth in claim 16, wherein the cam means incline on the exterior of the split nut continues into the flat face complementary to and driven by the flat face of the opening through the drive plate, wherein separation means comprised of at least one compression spring disposed between the semicircular members yieldingly separates them into a release mode, wherein pilot and lock means guides the semicircular members into constrictive and locked threaded engagement with the bolt, wherein a return spring urges the drive plate toward engagement with the reduced upper portion of the split nut, and wherein a mode positioning means alternately engages with the upper reduced portion of the split nut and with a groove in the lower enlarged portion portion of the split nut to selectively hold a release and a lock mode of the fastener.

* * * * *